MOTOR VEHICLE DOOR WINDOW CONTROL

Original Filed Oct. 10, 1962 4 Sheets-Sheet 1

MOTOR VEHICLE DOOR WINDOW CONTROL

Original Filed Oct. 10, 1962 4 Sheets-Sheet 2

MOTOR VEHICLE DOOR WINDOW CONTROL

Original Filed Oct. 10, 1962 4 Sheets-Sheet 3

MOTOR VEHICLE DOOR WINDOW CONTROL

Original Filed Oct. 10, 1962

United States Patent Office

Re. 26,281
Reissued Oct. 17, 1967

26,281

MOTOR VEHICLE DOOR WINDOW CONTROL

Johannes Werner, Offenbach (Main), Germany, assignor to H. T. Golde G.m.b.H. & Co. K.G., Frankfurt am Main, Germany Original No. 3,181,857, dated May 4, 1965, Ser. No. 229,639, Oct. 10, 1962. Application for reissue Jan. 10, 1966, Ser. No. 539,231

8 Claims. (Cl. 49—352)

Matter enclosed in heavy brackets [ ] appears in the original patent but forms no part of this reissue specification; matter printed in italics indicates the additions made by reissue.

*ABSTRACT OF THE DISCLOSURE*

*Between two panels is arranged a cable for raising and lowering a window, the cable being guided in a duct formed by flanges extending from one of the panels towards the other.*

This invention relates to [doors] *window controls* for motor vehicles.

According to the present invention, there is provided a motor vehicle door *or the like*, comprising an outer panel, an inner panel connected to said outer panel, door portions defining a window aperture therein, panel portions below said door portions defining a space between said inner panel and said outer panel, window guide means disposed at opposite upwardly extending sides of said aperture, a window slidable along said guide means between an open position in which said window extends in said space and a closed position in which said window closes said aperture, a connecting means attached to the lower edge of said window, a driving cable connected to said connecting means and located at said inner panel for slidably displacing said window, and projecting portions integral with said inner panel and located along the path of said cable and supporting said cable.

In order that the invention may be clearly understood and readily carried into effect, reference will now be made, by way of example, to the accompanying drawings, wherein.

Figure 1:
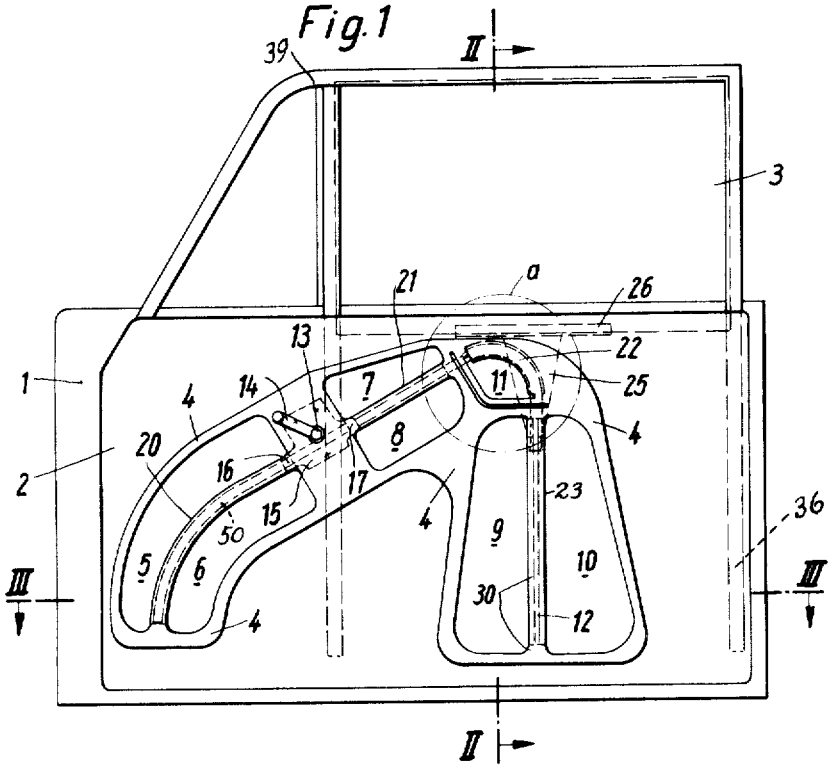
FIGURE 1 shows a side elevation of a motor vehicle door seen from inside the vehicle.

Referring to the drawings, the door has an outer panel 1 or 41 and an inner panel 2 or 42 connected to the outer panel. A window frame 39 or 40 connected to the panels has disposed below it a hollow space 37 or 38 between the panels. At opposite, vertical sides of the window aperture the window frame has vertical window guides 36 or 52. A window 3 is vertically slidable along the window guides between an open position in which the window 3 extends in the hollow space and a closed position in which the window closes the window aperture. A driving cable 50 is connected via a window driver 24, a bracket 25 and a fitting 26 to the lower edge of the window 3 for vertically displacing the window. Projecting portions 4 and 20 to 23, or 44 and 54, integral with the inner panel and located along the path of the cable, guidably support the cable in a manner which will be explained more fully hereinafter.

Figure 2:
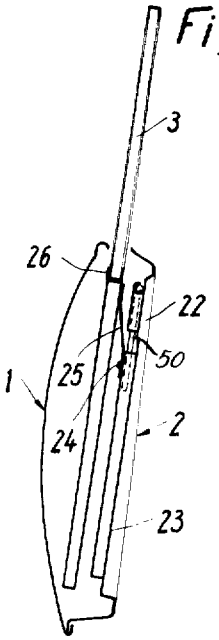
FIGURE 2 shows a section taken on the line II—II of FIGURE 1.

In connection with FIGURES 1 to 8, and as FIGURE 2 particularly shows, the window guides 36 and a drive device for the slidable window 3 are arranged in the cavity between the two panels, and in fact the drive device is mounted on the inner panel 2. For this purpose, the inner panel 2 of the door is formed with a relatively large outwardly projecting recessed portion 4 (see FIGURE 3) which is formed with a number of apertures 5 to 11. The webs remaining between the apertures 5 to 11 serve for guiding the driving cable. The drive device includes a hand crank 14 of which the spindle is mounted in a housing 15 and carries a pinion 13 with which there meshes tangentially screw-threaded cable 50 which, at the two sides of the housing 15, issues from the housing through extension pipes 16 and 17 provided on the housing. This cable is axially displaceable, through rotation of the hand crank 14, in guide ducts formed by the projecting portions 20, 21, 22 and 23. The cable is so guided by the ducts 20 to 23 as to be capable of transmitting axial force. The duct 23 has a longitudinal slot 12 through which projects the driver 24 (see FIGURE 2), the driver being connected fast to the cable. The driver 24 is connected rigidly through the rigid carrier 25 to the fitting 26 on the lower edge of the window, so that the window is lowered when the cable moves the driver 24 downwardly, whereas, when the cable is moved in the opposite direction in its guides, i.e., with the pinion rotating in the opposite direction in the housing 15, the driver 24 and the window 3 are moved upwards into the closed position of the window, which is shown in FIGURE 1.

Figure 3:
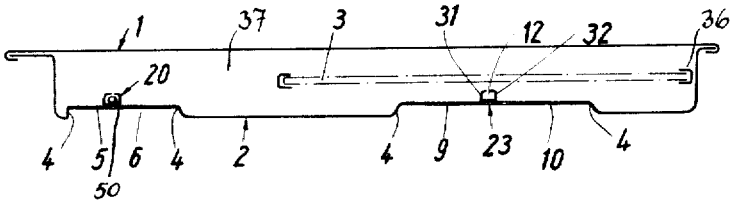
FIGURE 3 shows a section taken on the line III—III of FIGURE 1.

The guide ducts 20 to 23 for the cable are formed directly from the material of the inner panel 2 of the door, namely by bending-over punched-out flanges of material. For example, the guide duct 23 is formed, as FIGURE 3 shows, from the web 30 which remains of the door panel 2 between the apertures 9 and 10, the web comprising punched-out flanges 31 and 32 at both sides which are so bent over into the hollow space between the panels as to form a tube provided with a longitudinal slot.

Figure 4:
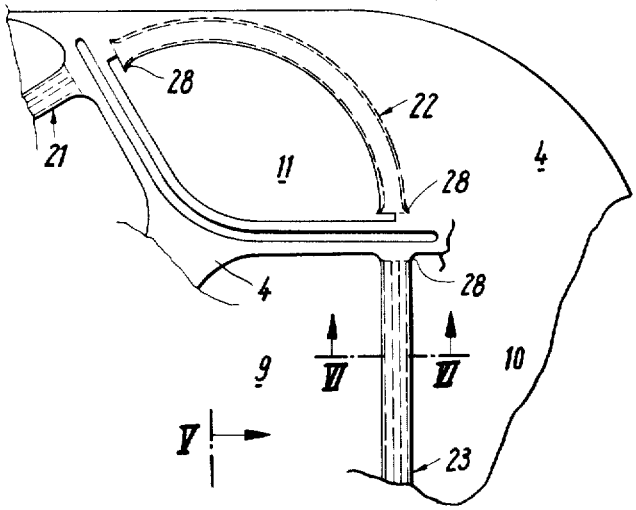
FIGURE 4 is a detail of FIGURE 1, the detail lying within the circle "a" in FIGURE 1.
Figure 5:
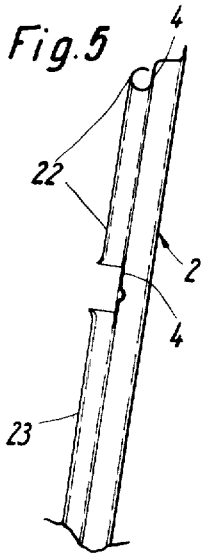
FIGURE 5 shows a section taken on the line V—V of FIGURE 4.
Figure 9:
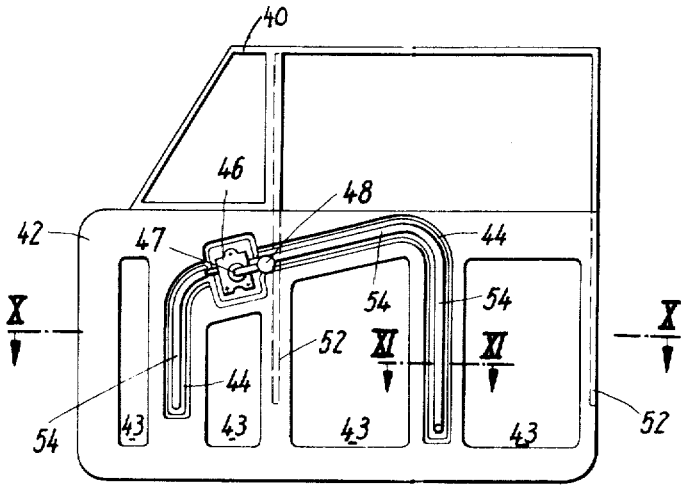
FIGURE 9 is a view similar to FIGURE 1 of a modified version of the door.

Similarly, the guide ducts 20 and 21 are formed from the door panel 2 by bending over flanges which are integral with the relevant webs. The guide duct 22, as FIGURES 4 and 5 show particularly, is formed by rolling-over one flange outwardly. FIGURE 4 also shows that the ducts 20 to 23 have funnel-shaped flares 28 at their ends to prevent damaging or breaking of the cable by the ends of the ducts.

Figure 7:
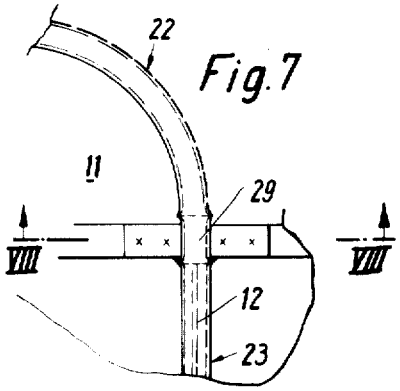
FIGURE 7 is a view similar to FIGURE 4 showing a variant of the part shown in FIGURE 4.
Figure 8:
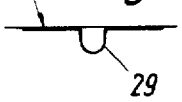
FIGURE 8 shows a section taken on the line VIII—VIII of FIGURE 7.

Since the cable is supported over its entire length by the recessed portion 4 in the door panel 2, the portion 4 having a tangential relationship to the cable, it is possible for the cable to be left without any additional guidance over short distances, for example between adjacent ends 28 of the guides 22 and 23, as shown in FIGURE 4. FIGURES 7 and 8, however, show that it is instead possible to use, between the ends 28, a channel-section guide piece 29 which is placed on the portion 4 of the door panel 2 and is fixed, for example by spot welding, at its lateral tongues to the door panel 2.

Figure 6:
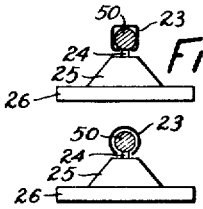
FIGURE 6 shows two variants of a section taken on the line VI—VI of FIGURE 4 through a cable guide duct.

Each of the guide ducts 20 to 22 can be formed of two sheet metal flanges punched out at respective sides of a supporting web and bent together to form a slotted tube, as is necessary for the guide duct 23 in the working region of the driver 24. The guide ducts 20, 21 and 22, however, could each instead be rolled from a single sheet metal flange, in the manner illustrated in the case of the arcuate guide duct 22. The internal cross-section of the guide ducts can be of any desired form, conveniently such that the cable is in contact at at least three points. As shown in FIGURE 6, the internal cross-section can be circular or substantially rectangular.

Alternatively, per se known guide tubes not integral with the portion 4 can be used for parts of or for the entire course of the cable travel and be supported on the portion 4 by suitable fixing means, for example clips, or sheet metal tabs formed from the inner door panel itself. Such guide tubes can be stable in themselves, and can be fabricated from metal sheeting, light metal, plastics, or the like. However, it is also possible to use guide tubes which are not adequately stable in themselves, and in that case the portion 4 which supports them enables them to retain their desired form.

Figure 10:
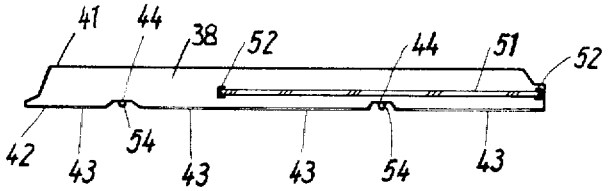
FIGURE 10 shows a section taken on the line X—X of FIGURE 9.

The version shown in FIGURES 9 to 13, is advantageously used in cases where, for static reasons, the inner door panel must not have any apertures directly adjoining the cable path. The inner panel 42 is provided with four apertures 43 and with an inwardly pressed projecting portion 44 correspnoding to the bearing portion 4 shown in FIGURES 1 to 8, the cross-section of this portion 44 being shown in FIGURE 10 and, on a larger scale, in FIGURE 11. Rigidly connected to the door panel 42 is a housing 46 in which a toothed driving wheel 47 is mounted to be rotated by means of a band crank 48. The driving wheel engages in a screw-thread 49 on a cable 50 (see FIGURE 11), the cable 50 being connected to the lower edge of the sliding window in the same way as shown in FIGURES 1 to 8. The sliding window 51 slides in the vertical guides 52. FIGURE 10 shows the window in its lower, i.e., opened position.

Figure 11:
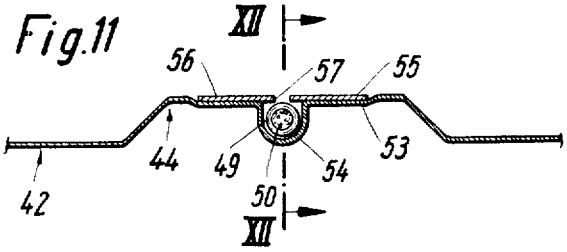
FIGURE 11 shows a section taken on the line XI—XI of FIGURE 9.

The larger part of the tubular guides for the cable 50 is formed by the open channel 54 provided in the inner panel 42 of the door. As FIGURE 11 shows particularly, the projecting portion 44 is provided with a shallow depression 53 and, within this depression 53, with an open channel 54 in which the cable 50 is guided. The open channel is closed by two sheet metal strips 55 and 56 except for a narrow slot 57. The slot 57 permits the passage therethrough of a driver corresponding to the driver 24. The slot 57 need extend only over the length of the working travel of this driver. Outside this length of travel, the mouth of the channel 54 can therefore be completely closed by a single sheet metal strip 58 instead of being partially closed by the two strips 55 and 56.

The width and position of the slot 57 depend in each individual case on the kind of connection between the cable and the window. Therefore, in some other cases, the slot may also be situated in the channel 54, particularly if this channel is arranged in mirror-image fashion relative to its illustrated position, so that it projects from the portion 44 into the hollow space between the outer and inner panels.

Figure 14:
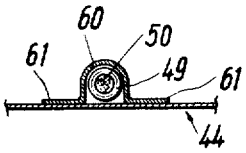
FIGURE 14 is a view similar to FIGURE 11 showing a variant of the part shown in FIGURE 11.

The cable guides can also be constructed as shown in FIGURE 14, wherein a channel-section sheet metal strip 60 with mounting flanges 61 is spot-welded to the bearing portion 44.

Alternatively, the sheet metal strip and the inner panel could have relatively shallow channels situated opposite one another to form the cable guides, but as a rule the construction shown in FIGURE 11 or 14 is simpler, since in this case a channel need be formed only in one of the parts which form the cable guides namely in either the inner panel or in the sheet metal strip spot-welded thereto.

Figure 12:
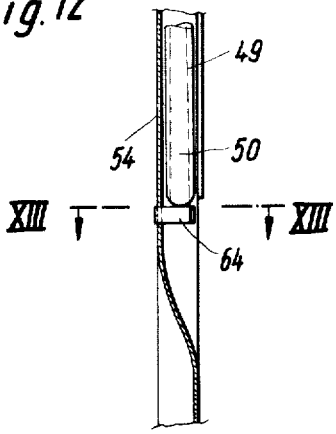
FIGURE 12 shows a section taken on the line XII—XII of FIGURE 11.
Figure 13:
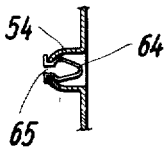
FIGURE 13 shows a section taken on the line XIII—XIII of FIGURE 12.

FIGURE 12 shows the transition of one end of the channel 54 into the depression 53 and the limiting of the cable travel by a spring clip 64, the screw-threading 49 on the end of the cable 50 being indicated merely by chain lines. The spring clip 64 is inserted in a bore 65 in the channel 54 after the cable has been introduced into the channel. This spring clip 64 forms a stop which is particularly simple, but it would also be possible, if so desired, to use other stop means.

The projecting portion 4 or 44 formed directly from the inner panel iteslf can project either inwardly or outwardly of the panel, and follows the desired cable path. Thus the path of the cable is determined at the time of pressing of the door panel, thereby dispensing with all the measurements, which have hitherto been necessary when the cable is about to be mounted in position, in order to determine the path of the cable.

I claim:

1. A motor vehicle door comprising an outer panel, an inner panel connected to said outer panel and defining a space therebetween, a window frame connected to the panels and defining a window aperture, window guide means disposed at opposite locations and extending in said aperture in the window frame and in said space between the panels, a window slidably supported in said guide means for movement between a raised position in which the window fills said aperture and a lowered position in which the window is accommodated in the space between the panels, said window having a lower edge, connecting means attached to the lower edge of the window, a driving cable of determinable length engaged with the connecting means, said inner panel being provided with a plurality of apertures, said inner panel including an integral web portion remaining between adjacent apertures with free remote edges, said web portions including upturned flanges extending in a direction towards the outer panel to define a duct extending along a particular path on said inner panel, said driving cable being guidably supported along substantially its entire length in said duct for longitudinal displacement, and means engaging said cable for displacing the same lengthwise through said duct in opposite directions for raising and lowering the window.

2. A door as claimed in claim 1, wherein the free edges of the web portions face one another in spaced relation to define a slot extending lengthwise along at least a portion of the duct, said connecting means extending through said slot to engage the driving cable such that displacement of the driving cable causes concurrent displacement of the window.

3. A door as claimed in claim 1, wherein said duct comprises a plurality of separate duct portions which cooperatively support the cable along substantially its entire length, said duct portions having adjacent facing ends which are outwardly flared to facilitate passage of the driving cable.

4. A door as claimed in claim 1, comprising a spring clip supported within said duct and constituting a stop for displacement of the cable.

*5. A motor vehicle structure comprising an outer panel, an inner panel connected to said outer panel and defining a space therebetween, a window guide means disposed at least in part in said space between the panels, a window slidably supported in said guide means for movement between a raised position in which the window extends upwardly from the space between the panels and a lowered position in which the window is accommodated in the space between the panels, said window having a lower edge, connecting means attached to the lower edge of*

*the window, a driving cable of determinable length engaged with the connecting means, said inner panel being provided with a plurality of apertures, said inner panel including an integral web portion remaining between adjacent apertures with free remote edges, said web portions including upturned flanges extending in a direction towards the outer panel to define a duct extending along a particular path on said inner panel, said driving cable being guidably supported along substantially its entire length in said duct for longitudinal displacement, and means engaging said cable for displacing the same lengthwise through said duct in opposite directions for raising and lowering the window.*

*6. A structure as claimed in claim 5, wherein the free edges of the web portions face one another in spaced relation to define a slot extending lengthwise along at least a portion of the duct, said connecting means extending through said slot to engage the driving cable such that displacement of the driving cable causes concurrent displacement of the window.*

*7. A structure as claimed in claim 5, wherein said duct*

*comprises a plurality of separate duct portions which cooperatively support the cable along substantial its entire length, said duct portions having adjacent facing ends which are outwardly flared to facilitate passage of the driving cable.*

*8. A structure as claimed in claim 5, comprising a spring clip supported within said duct and constituting a stop for displacement of the cable.*

References Cited

The following references, cited by the Examiner, are of record in the patented file of this patent or the original patent.

UNITED STATES PATENTS

| | | | |
|---|---|---|---|
| 1,967,338 | 7/1934 | Uecker | 49—378 |
| 2,919,911 | 1/1960 | Furtah | 49—352 |
| 3,069,197 | 12/1962 | Wernig | 49—400 |

DAVID J. WILLIAMOWSKY, *Primary Examiner.*

J. KARL BELL, *Assistant Examiner.*